(12) United States Patent
Elizondo

(10) Patent No.: US 6,967,579 B1
(45) Date of Patent: Nov. 22, 2005

(54) RADIO FREQUENCY IDENTIFICATION FOR ADVANCED SECURITY SCREENING AND SORTATION OF BAGGAGE

(75) Inventor: Paul Elizondo, Escondido, CA (US)

(73) Assignee: Single Chip Systems Corporation, San Diego, CA (US)

( * ) Notice: Subject to any disclaimer, the term of this patent is extended or adjusted under 35 U.S.C. 154(b) by 118 days.

(21) Appl. No.: 10/795,033

(22) Filed: Mar. 5, 2004

(51) Int. Cl.7 ............................................... G08B 13/14
(52) U.S. Cl. ............................ 340/572.4; 340/572.1; 340/572.8
(58) Field of Search ..................... 340/572.1, 572.4, 340/572.7, 693.1, 693.3, 10.1, 10.4, 10.41; 700/115

(56) References Cited

U.S. PATENT DOCUMENTS

| | | | |
|---|---|---|---|
| 6,104,291 A * | 8/2000 | Beauvillier et al. ...... | 340/572.1 |
| 6,218,943 B1 * | 4/2001 | Ellenbogen ............... | 340/572.4 |
| 6,696,954 B2 * | 2/2004 | Chung ...................... | 340/572.7 |
| 6,703,935 B1 * | 3/2004 | Chung et al. ............. | 340/572.7 |
| 6,768,419 B2 * | 7/2004 | Garber et al. ............ | 340/572.4 |
| 6,839,604 B2 * | 1/2005 | Godfrey et al. ............. | 700/116 |
| 6,853,294 B1 * | 2/2005 | Ramamurthy et al. ...... | 340/10.1 |

* cited by examiner

Primary Examiner—Van T. Trieu

(74) Attorney, Agent, or Firm—Baker & McKenzie

(57) ABSTRACT

An RFID conveyor system comprises one or more wedges designed to allow an RFID scanner to detect and uniquely identify RFID-tagged baggage as they are conveyed through an antenna array. The RFID conveyor system can also be designed to prevent the reading of previous or subsequent bags by using antennas with highly focused RF read fields in conjunction with RF energy absorbing materials, such as RF curtains, designed to eliminate the identification of any baggage located outside of the "read" area.

25 Claims, 6 Drawing Sheets

RADIO FREQUENCY IDENTIFICATION FOR ADVANCED SECURITY SCREENING AND SORTATION OF BAGGAGE

BACKGROUND

1. Field of the Invention

The field of the invention relates generally to Radio Frequency Identification (RFID) systems and more particularly to systems and methods for implementing an RFID conveyor systems.

2. Background Information

The aviation industry is experiencing an increased need for advanced security screening and tracking of airline passenger baggage. One of the security procedures that the aviation industry has sought to implement is known as positive passenger-to-baggage matching (PPBM), in which passengers are matched with their checked baggage prior to flight departure. If the passenger does not board the flight, for example, their luggage will be off-loaded from the airplane. This procedure provides greater customer service as well as security.

Currently-used barcode tracking systems are limited in their capabilities and efficiency, and greater reliability and robustness than is currently in place is required. For example, in order for a barcode tag on a baggage item to be read, the baggage item or barcode scanner must be manually positioned such that the scanner is facing, and in very close proximity to, the bar code tag. This can make the identification and tracking of baggage a laborious and time-consuming process. As a result, airports need to implement cost-effective, easy-to-install technology that provides fast and accurate baggage sorting and security. Given the millions of baggage items that pass through airports on a daily basis, it is desirable to have a system in which baggage items are electronically identified automatically, regardless of their orientation on the conveyor belt. Of particular interest is a technology that can be integrated with existing baggage reconciliation systems.

SUMMARY OF THE INVENTION

An RFID conveyor system comprises one or more wedges designed to allow an RFID scanner to detect and uniquely identify RFID-tagged baggage as they are conveyed through an antenna array. The RFID conveyor system can also be designed to prevent the reading of previous or subsequent bags by using antennas with highly focused RF read fields in conjunction with RF energy absorbing materials, such as RF curtains, designed to eliminate the identification of any baggage located outside of the "read" area.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
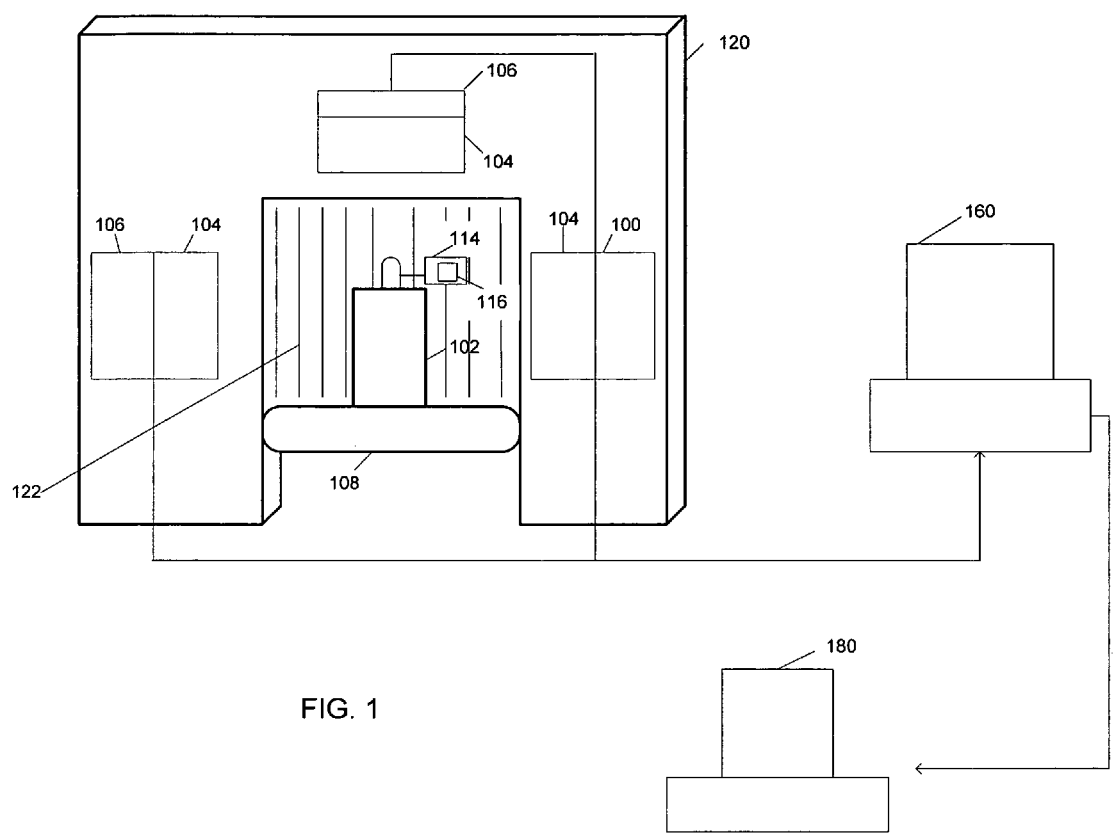
FIG. 1 is a diagram illustrating an example RFID conveyor system configured in accordance with one embodiment.

FIG. 1 is a diagram illustrating an RFID conveyor system 100 configured in accordance with one embodiment of the systems and methods described herein. RFID system 100 can be implemented, for example, through modification of an existing airport Baggage Reconciliation System (BRS). In RFID conveyor system 100, RFID-tagged baggage items 102 are moved along a conveyor belt 108 and passed through an array of RFID antennas 104. Each baggage item 102 can have attached thereto a baggage tag 114 comprising an RFID tag 116. For example, an RFID tag 116 can be inserted into, or attached to the surface of, baggage tag 114. In one embodiments, baggage tag 114 can be a standard International Air Transport Association (IATA) baggage tag.

RFID antennas 104 can be mounted in a mounting structure 120 and can be interfaced with one or more RFID scanners. For example, in the embodiment of FIG. 1, each RFID antenna 104 is interfaced with a RFID scanner 106; however, depending on the embodiment, a single RFID scanner 106 can be interfaced with each RFID antenna 104. Moreover, more than four RFID antennas 104, interfaced with one or more RFID scanners 106, can be included in a RFID conveyor system 100 depending on the requirements of a particular implementation.

RF absorbing curtain 122 can also be mounted on mounting fame 120. As explained below, RF absorbing curtain 122 can be used to ensure accurate reading of RFID tags 116 and to prevent interference by RFID conveyor system 100 with other, surrounding systems.

RFID antennas 104 can be configured to operate within a specific frequency range. For example, in one embodiment, RFID antennas 104 can be configured to operate using ultra high frequency (UHF), e.g., 902–928 MHz, spread spectrum technology. Thus, in one example embodiment, RFID tags 116 can be configured to operate at approximately 915 MHz. RFID tags 116 can be dual dipole read-only RFID tags that contain a unique serial number, e.g., a unique 64-bit serial number. The serial number, or other information store on RFID tag 116, can be used to track baggage items 102 and to associate them with a passenger.

Mounting frame 120 can be configured to provide structural support for RFID scanner 106 and RFID antennas 104. In one embodiment, RFID antennas 104, and RFID scanners 106 depending on the implementation, are disposed above, below, and on the sides of conveyor belt 108. Mounting frame 120 can also be configured to act as an RF shield to keep spurious emissions from propagating into surrounding areas and causing false reads or interference with other radio systems operating in the area. Additionally, RF absorbing curtain 122 can be mounted on mounting structure 120 to prevent spurious emissions and false reads of baggage items 102 that have not entered the read zone yet. RFID antennas 104 can also be configured to have highly focused RF read fields in order to avoid interference and the reading of baggage items 102 outside of mounting structure 120.

Figure 2:
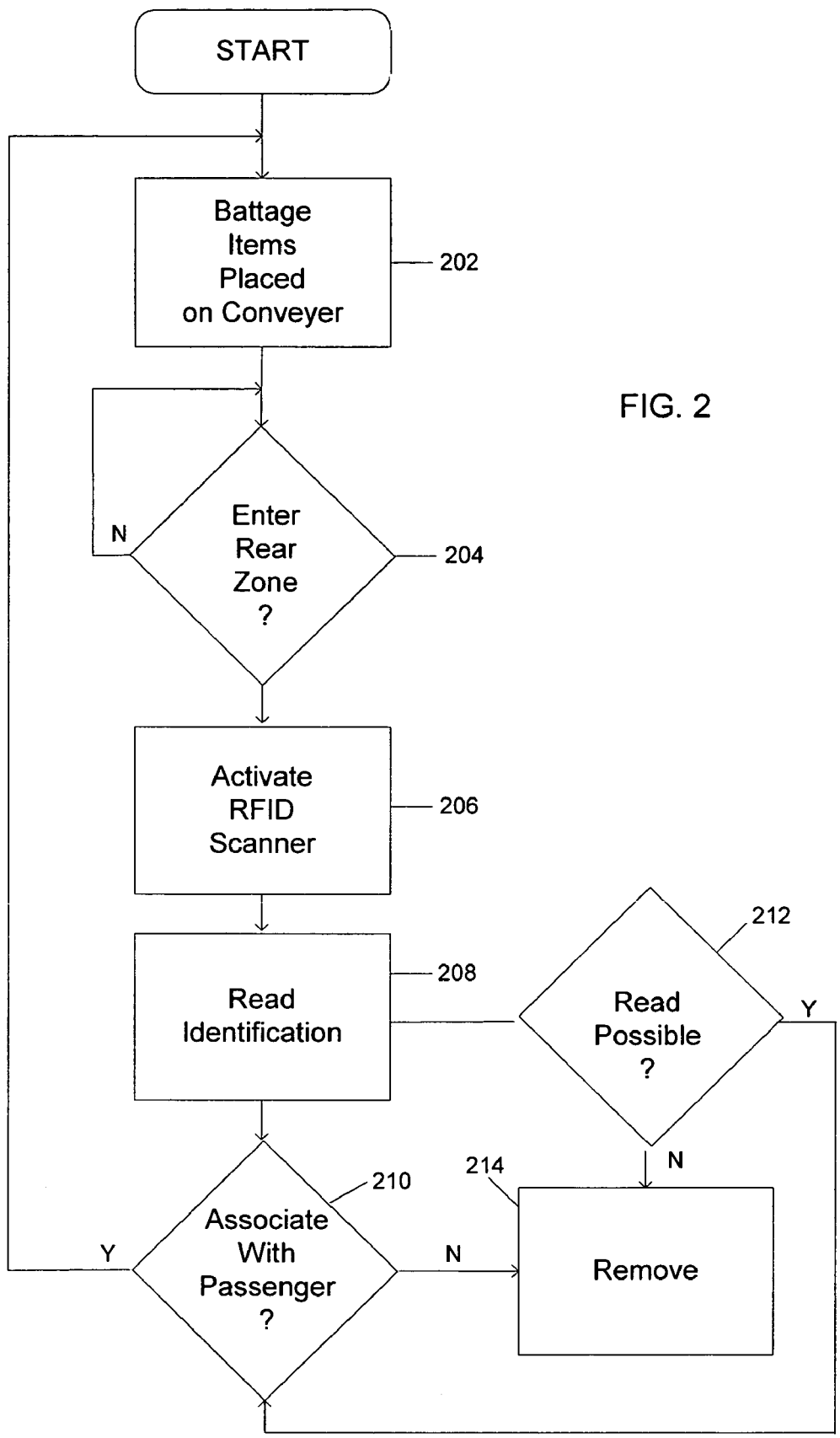
FIG. 2 is a flow chart illustrating an example method for tracking baggage items using the RFID conveyor system of FIG. 1 in accordance with one embodiment.

Thus, RFID conveyor system 100 can be used to track baggage items 102 as required by a particular implementation. FIG. 2 is a flow chart illustrating an example method for tracking baggage items 102 using, e.g., RFID conveyor system 100 in accordance with the systems and methods described herein. First, in step 202, a baggage item 102 is placed on conveyor belt 108. Conveyor belt 108 moves baggage item 102 toward mounting structure 120 and the associate RFID antennas 104. Antennas 104 can then be activated, in step 206, once baggage item 102 enters the read zone associated with RFID antennas 104, in step 204. For example, RFID antennas 104 can be activated by devices that detect the presence of baggage items 102 as they enter the read zone. Any of a plurality of detector device types can be used. For example, optical detectors, e.g., photo eyes (not shown), can be used to determine the exact positioning of baggage items 102 as they travel along conveyor belt 108.

Once RFID antennas 104 are activated in step 206, they can be used to allow RFID scanners 106 to read the identification, or other necessary information, from RFID tag 116 associated with baggage item 102 in step 208. The identification can then be correlated with a specific passenger, for example, in step 210. If the identification cannot be correlated with a passenger, in step 210, then a warning message can be generated causing baggage item 102 to be removed, in step 214, and possibly inspected.

As illustrated in FIG. 1, RFID scanner, or scanners, 104 can be interfaced with a control computer 160. Control computer 160 can, for example, be configured to control RFID scanners 106, to select the appropriate RFID antenna 104, and to set the appropriate power level. Thus, when an RFID tag 116 has been identified by an RFID scanner 106, the data read from RFID tag 116 can be transmitted to control computer 160. Control computer 160 can be configured to format the tag data as required and, depending on the embodiment, transmit the tag data to a host computer system 180. For example, the host computer system 180 can comprise part of an existing BRS system. The transmission of tag data from control computer 160 to host computer system 180 can occur via a variety of connectivity options, e.g. RS-232, wireless LAN/WAN, USB, or 10BaseT Ethernet, to name just a few. The tag data can then be used to correlate a baggage item 102 with a specific passenger in step 210.

The interface between an RFID scanner 106 and control computer 160 can similarly comprise one of many possible interface options. Alternatively, control computer 160 can be integrated into one or more RFID scanners 106. In another embodiment, control computer 160, or the functions performed thereby, can be integrated into host computer system 180.

In one implementation, control computer 160 can be configured to constantly monitor the length, spacing, and location of baggage items 102 as they travel along conveyor belt 108. For example, in one embodiment, one or more photo eyes and/or line speed controllers can be interfaced with control computer 160. In order to reduce the incidence of error in RFID conveyor system 100, a minimum baggage-to-baggage spacing, e.g. 18 inches, can be imposed for baggage items 102 entering mounting structure 120. If two or more baggage items 102 are allowed to enter mounting structure 120 with less than the desired minimum baggage-to-baggage spacing control computer 160 can prevent the baggage items 102 from being read, in step 212, and can cause them to be removed from conveyor belt 108 in step 214.

For example, in one implementation, control computer 160 can be configured to communicate with host computer system 180 and send a "too close" message (step 212) that causes host computer system 180 to stop conveyor belt 108 and provide an indication of which baggage items 102 need to be removed (step 214). Following such an occurrence, control computer 160 can be configured to log the event with a time stamp and store the time stamp along with the identifier read from the RFID tag 116 associated with each removed baggage item 102.

The speed of conveyor belt 108 can be monitored by a shaft-mounted line speed controller. In one embodiment, RFID conveyor system 100 can operate with conveyor belt speeds of greater than 240 feet per minute. Using the line speed controller in conjunction with, e.g., a baggage presence photo eyes, the exact position of each baggage item 102 can be known during the operation of RFID conveyor system 100, for example, within an accuracy of 0.5 inches.

Most airports, for example, have baggage conveyor systems with metallic conveyor sections that can disrupt the reading of RFID tags that are in close proximity to the metal. As a result, the implementation of RFID conveyor system 100 requires that an airport baggage conveyor system with metallic conveyor sections be retrofitted in some manner to ensure that all RFID tags 116 are read regardless of their orientation in relation to the metallic sections comprising the conveyor system. In one embodiment, the metallic sections within the read zone can be replaced by non-metallic conveyor section. This is often only practical for new conveyor systems. Thus, in another embodiment, wedges are used to retrofit existing metallic conveyor systems.

Figure 3:
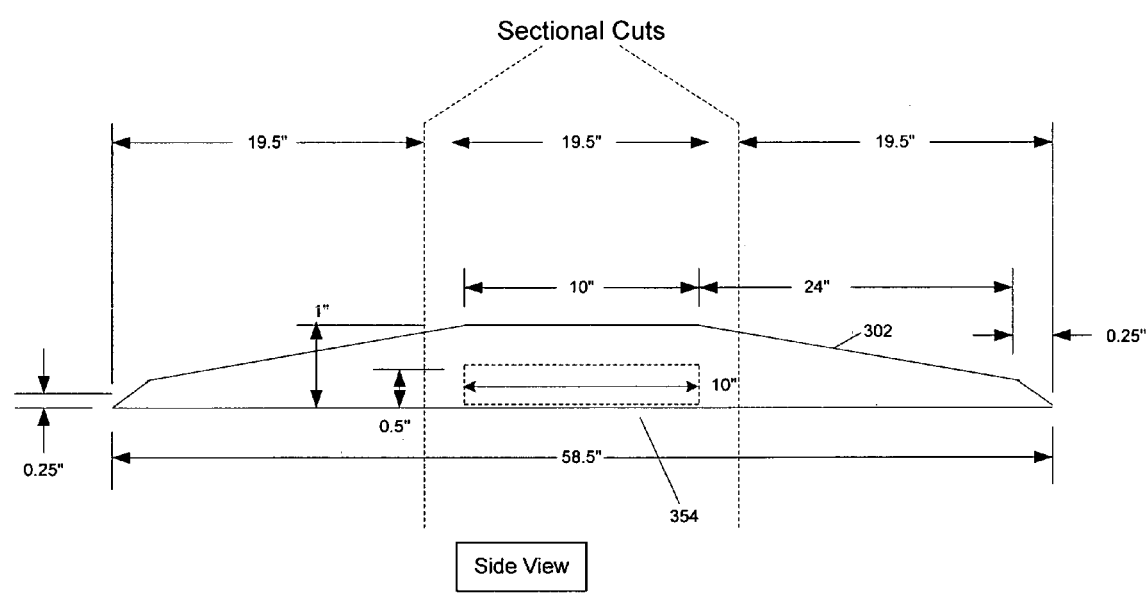
FIG. 3 is a side view of the belt wedge in accordance with one embodiment.

FIG. 3 is a diagram illustrating an example wedge 302 that can be used to retrofit an existing conveyor belt system in accordance with the systems and methods described herein. It will also be understood that a new conveyor belt system can also be manufactured to include wedges, such as wedge 302. Wedge 302 can be positioned between conveyor belt 108 and the metal conveyor sections on the sides and/or underneath conveyor belt 108. As conveyor belt 108 travels over, or past, a wedge 302, wedge 302 will push conveyor belt 108 away from the metallic conveyor sections. As described above, the identification or reading of RFID tags 116 can be disrupted when a RFID tag 116 is in close proximity to a metallic conveyor section. If a baggage tag 102, and associated RFID tag 116, is near the metallic conveyor section, then it too will be pushed away from the metallic conveyor section allowing the RFID tag to be read without interference from the metallic conveyor section.

Figure 4:
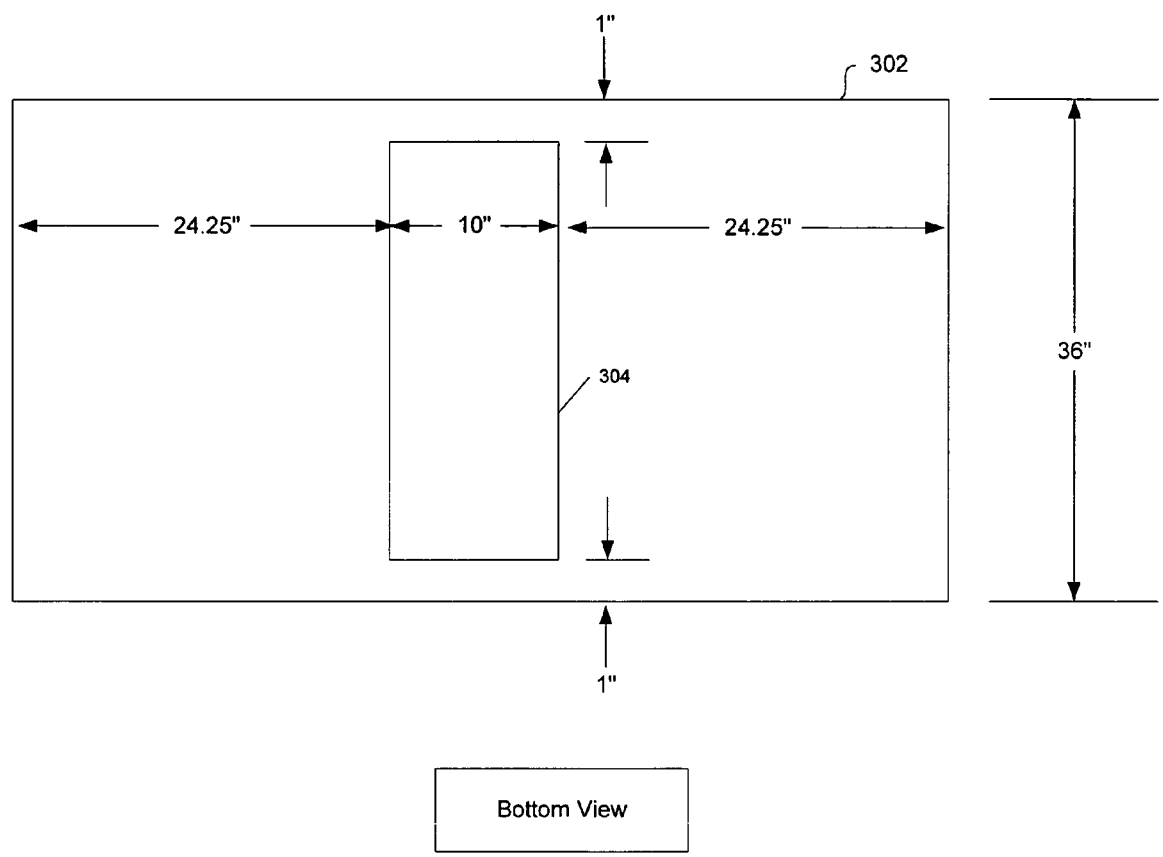
FIG. 4 is a top view of the belt wedge in accordance with one embodiment.

As can be seen in FIG. 3, wedge 302 can comprise a void 304 in which RFID antennas 104 can be installed. Depending on the embodiment, the associated RFID scanner(s) 106 can also be installed within void 304. FIG. 4 is a diagram illustrating a bottom view of wedge 302.

Exemplary dimension for wedge 302 are illustrated in FIGS. 3 and 4; however, it will be understood that the dimensions can vary as required by a particular implementation. For example, the dimensions can vary depending on the size and number of RFID antennas installed in void 304 and whether the associated RFID scanners 106 are also installed in void 106. Moreover, the dimensions associate with conveyor belt 108, mounting structure 120, etc., can also impact the dimensions of wedge 302.

Figure 5:
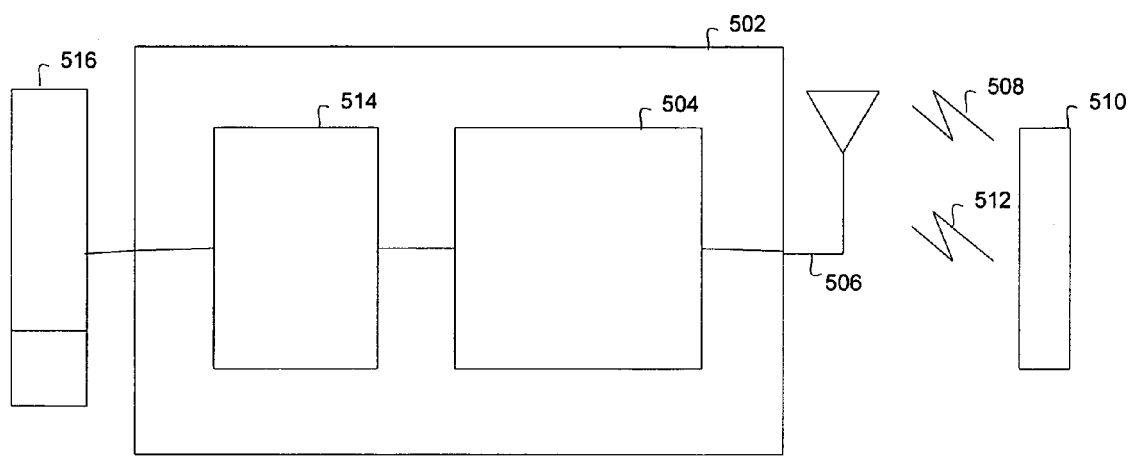
FIG. 5 is a diagram illustrating an exemplary RFID scanner that can be used in the RFID conveyor systems illustrated in FIGS. 1 and 2.

FIG. 5 is a diagram illustrating an exemplary RFID system 500 that illustrates an exemplary RFID scanner 502 communicates with one or more RFID tags 510. FIG. 5 is present to illustrate how RFID scanners 106, and associated RFID antennas 104, can be used to read RFID tags 116, e.g., in system 100. In system 500, data can be exchanged between scanner 502 and RFID tag 510 via radio transmit signal 508 and radio receive signal 512. RFID scanner 502 comprises RF transceiver 504, which contains transmitter and receiver electronics, and antenna 506, which are configured to generate and receive radio transit signal 508 and radio receive signal 512, respectively. Exchange of data can be accomplished via electromagnetic or electrostatic coupling in the RF spectrum in combination with various modulation and encoding schemes. RFID tag 510 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 508 determines the operational range of RFID tag 510.

RF transceiver 504 transmits RF signals to RFID tag 510, and receives RF signals from RFID tag 510, via antenna 506. The data in transmit signal 508 and receive signal 512 can be contained in one or more bits for the purpose of providing identification and other information relevant to the particular RFID tag application. When RFID tag 510 passes within the range of the radio frequency magnetic field emitted by antenna 506, RFID tag 510 is excited and transmits data back to RFID scanner 502. A change in the impedance of RFID tag 510 can be used to signal the data to RFID scanner 502 via receive signal 512. The impedance change in RFID tag 510 can be caused by producing a short circuit across the tag's antenna connections (not shown) in bursts of very short duration. RF transceiver 504 senses the impedance change as a change in the level of reflected or backscattered energy arriving at antenna 506.

Digital electronics 514, which can comprise a microprocessor with RAM, performs decoding and reading of receive signal 512. Similarly, digital electronics 514 performs the coding of transmit signal 508. Thus, RFID scanner 502 facilitates the reading or writing of data to RFID tags, e.g. RFID tag 510, that are within range of the RF field emitted by antenna 504. Together, RF transceiver 504 and digital electronics 514 comprise RFID scanner 502. Finally, digital electronics 514 can be interfaced with an integral display and/or provide a parallel or serial communications interface to a host computer or industrial controller, e.g. host computer 516. Alternatively, host computer 516 can be integrated into RFID scanner 502.

Figure 6:
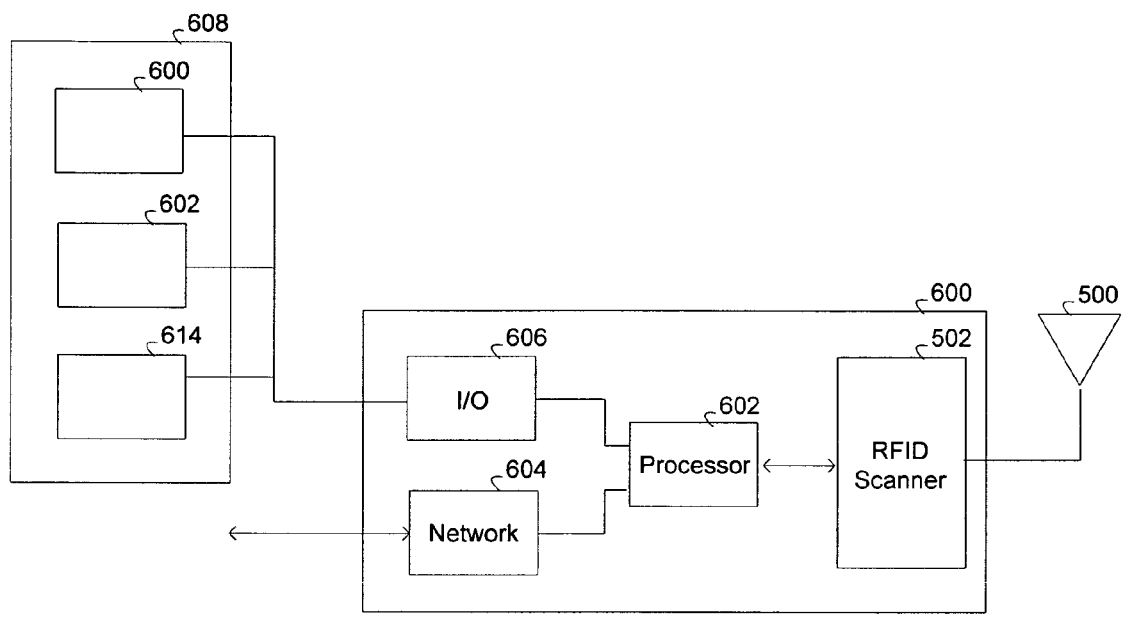
FIG. 6 is a diagram illustrating an RFID scanner that includes a control computer 602 and that can be used in the RFID conveyor systems illustrated in FIGS. 1 and 2.

FIG. 6 is a diagram illustrating an RFID scanner 600 that includes a control computer 602. Thus, for example, the RFID scanner functionality provided by scanner 502 can be included in RFID scanner 600 along with control computer 602. A network interface 604 can also be included in RFID scanner 600, e.g., to interface RFID scanner with a host computer 180. As mentioned above, network interface 604 can comprise a RS-232, wireless LAN/WAN, USB, or 10 BaseT Ethernet, to name just a few, interface.

RFID scanner 600 can also include Input/Output (I/O) 606, which can be configured to interface control computer 602 with a variety of devices 608. For example, devices 608 can comprise devices 610 configured to detect the position of an item on conveyor belt 108. Such detectors 610 can include, for example, optical detectors. Devices 608 can also include lien speed controllers 612, and alarms 614.

In one embodiment, RFID scanner 600 comprises stackable PC-104 circuit cards in order to keep the overall size of RFID scanner 600 relatively small. The circuits and components illustrated in FIG. 6 can be installed on one or more PC-104 circuit cards.

While certain embodiments of the inventions have been described above, it will be understood that the embodiments described are by way of example only. Accordingly, the inventions should not be limited based on the described embodiments. For example, while embodiments involving an RFID conveyor system used for tracking baggage items, an RFID conveyor system configured in accordance with the systems and methods described herein can be used to track any type of item. Thus, the scope of the inventions described herein should only be limited in light of the claims that follow when taken in conjunction with the above description and accompanying drawings.

What is claimed:

1. A RFID conveyor system, comprising:
a metal conveyor section;
a conveyor belt configured to convey items with associated RFID tags;
a RFID antenna configured to communicate with the RFID tags;
a RFID scanner interfaced with the RFID antenna, the RFID scanner configured to read the RFID tags via the RFID antenna; and
a wedge configured to push the conveyor belt away for a metal conveyor section to ensure that the RFID scanner can accurately read the RFID tags without interference from the metal conveyor section.

2. The RFID conveyor system of claim 1, further comprising a plurality of wedges configured to push the conveyor belt away for a plurality of metal conveyor section to ensure that the RFID scanner can accurately read the RFID tag without interference from the metal conveyor section.

3. The RFID conveyor system of claim 2, wherein one of the plurality of wedges is installed on a sidewall.

4. The RFID conveyor system of claim 2, wherein one of the plurality of wedges is installed beneath the conveyor belt.

5. The RFID conveyor system of claim 1, wherein the wedge comprises a void, and wherein the RFID antenna is installed within the void.

6. The RFID conveyor system of claim 1, wherein the wedge comprises a void, and wherein the RFID scanner is installed within the void.

7. The RFID conveyor of claim 1, further comprising a mounting structure, wherein the RFID antenna is mounted in the mounting structure.

8. The RFID conveyor system of claim 7, wherein the RFID scanner is mounted within the mounting structure.

9. The RFID conveyor system of claim 7, wherein the mounting structure is configured to block spurious emissions.

10. The RFID conveyor system of claim 7, further comprising a RF absorption curtain mounted on the mounting structure.

11. The RFID conveyor system of claim 1, wherein the RFID scanner comprises a control computer.

12. The RFID conveyor system of claim 1, wherein the RFID scanner is interfaced with a control computer.

13. The RFID conveyor system of claim 12, wherein the control computer is configured to constantly monitor aspects related to the items.

14. The RFID conveyor system of claim 13, further comprising a detector interfaced with the control computer, the detector configured to detect the location of the items, wherein the control computer is configured to monitor aspect related to the items using the detector.

15. The RFID conveyor system of claim 14, wherein the detector is an optical detector.

16. The RFID conveyor system of claim 13, wherein the aspects include the length, spacing, and location of the items.

17. The RFID conveyor system of claim 12, wherein the control computer is configured to maintain a minimum spacing between items.

18. The RFID conveyor system of claim 17, further comprising a line speed controller interfaced with the control computer, the line speed controller configured to control the speed of the conveyor belt, wherein the control computer is configure dot control the spacing between items using the line speed controller.

19. The RFID conveyor system of claim 12, wherein the control computer is configured to generate a message when the spacing between items is too small.

20. The RFID conveyor system of claim 19, wherein the control computer is configured to generate a time stamp and associated it with the message.

21. The RFID conveyor system of claim 20, wherein the control computer is configured to receive information from the RFID tags associated with the items that are spaced too close together, and to associate the information with the time stamp.

22. A method for retrofitting for an RFID conveyor system, comprising:
    installing an RFID antenna into a wedge; and
    installing the wedge into the RFID conveyor system in such a position that it will push a conveyor belt away from a metal conveyor section in a read zone in the RFID conveyor system.

23. The method of claim 22, wherein installing the wedge comprises installing the wedge beneath conveyor belt.

24. The method of claim 22, wherein installing the wedge comprises installing he wedge on a sidewall of the RFID conveyor system.

25. The method of claim 22, further comprising installing a plurality of RFID antennas into a plurality of wedges and installing he plurality of wedges into the RFID conveyor system.

* * * * *

UNITED STATES PATENT AND TRADEMARK OFFICE
CERTIFICATE OF CORRECTION

PATENT NO. : 6,967,579 B1
DATED : November 22, 2005
INVENTOR(S) : Paul Elizondo

It is certified that error appears in the above-identified patent and that said Letters Patent is hereby corrected as shown below:

Column 2,
Line 26, delete "embodiments" and insert -- embodiment --.
Line 40, delete "fame" and insert -- frame --.

Drawings,
Sheet 2, Box 202 of the flow diagram, delete "Battage" and insert -- Baggage --.

Signed and Sealed this

Thirteenth Day of June, 2006

JON W. DUDAS
*Director of the United States Patent and Trademark Office*